United States Patent
Naik (10) Patent No.: US 10,767,919 B2
(45) Date of Patent: Sep. 8, 2020

(54) METHOD FOR ENSURING RELIABLE CORE MATERIAL FILL AROUND THE PASS THROUGHS IN A VACUUM INSULATED STRUCTURE

(71) Applicant: WHIRLPOOL CORPORATION, Benton Harbor, MI (US)

(72) Inventor: Abhay Naik, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 84 days.

(21) Appl. No.: 16/311,918

(22) PCT Filed: Jul. 26, 2016

(86) PCT No.: PCT/US2016/043986
§ 371 (c)(1),
(2) Date: Dec. 20, 2018

(87) PCT Pub. No.: WO2018/022008
PCT Pub. Date: Feb. 1, 2018

(65) Prior Publication Data
US 2019/0178562 A1  Jun. 13, 2019

(51) Int. Cl.
*F25D 23/06* (2006.01)
*F16L 59/12* (2006.01)
(Continued)

(52) U.S. Cl.
CPC ......... *F25D 23/065* (2013.01); *F25D 23/061* (2013.01); *F16L 59/06* (2013.01);
(Continued)

(58) Field of Classification Search
CPC ............... F25D 23/061; F25D 2201/14; F25D 2317/043; F25D 2317/06; F25D 23/065; F16L 59/121; F16L 59/06; F16L 59/075
See application file for complete search history.

(56) References Cited

U.S. PATENT DOCUMENTS

| 2,164,143 A | 6/1939 | Munters |
| 2,989,156 A | 6/1961 | Brooks et al. |

(Continued)

FOREIGN PATENT DOCUMENTS

| DE | 19520020 A1 | 12/1996 |
| EP | 2778583 A2 | 9/2014 |

(Continued)

*Primary Examiner* — David J Teitelbaum
(74) *Attorney, Agent, or Firm* — Price Heneveld LLP (57) ABSTRACT

A vacuum insulated refrigerator structure with a vacuum core material filled in around an elongated umbilical. The vacuum insulated refrigerator structure is made of a shell having a liner and a wrapper wherein the shell forms an internal cavity. A gas permeable casing surrounds the entire length of the elongated umbilical passing through the internal cavity of the shell. A vacuum tube is inserted at a first opening between the gas permeable casing and the elongated umbilical and a second end of the elongated umbilical is coupled to the shell at a second opening in the liner. A vacuum is formed in the internal cavity of the shell through the vacuum tube while adding the vacuum core material fill. In the shell, an elongated umbilical has one or more elongated internal passageways wherein the one or more utility lines may be routed through the one or more elongated internal passageways.

20 Claims, 7 Drawing Sheets

(51) Int. Cl.
*F16L 59/06* (2006.01)
*F16L 59/075* (2006.01)

(52) U.S. Cl.
CPC .......... *F16L 59/075* (2013.01); *F16L 59/121* (2013.01); *F25D 2201/14* (2013.01); *F25D 2317/043* (2013.01); *F25D 2317/06* (2013.01)

(56) References Cited

U.S. PATENT DOCUMENTS

| | | | |
|---|---|---|---|
| 4,180,297 A | | 12/1979 | Abrams |
| 4,186,945 A | * | 2/1980 | Hahn ................. F16L 5/022 |
| | | | 174/153 G |
| 4,715,512 A | * | 12/1987 | Buchser ............. F25D 23/064 |
| | | | 220/592.1 |
| 5,509,248 A | | 4/1996 | Dellby et al. |
| 5,827,385 A | | 10/1998 | Meyer et al. |
| 6,109,712 A | * | 8/2000 | Haworth ............. F24C 15/34 |
| | | | 312/400 |
| 2011/0290808 A1 | | 12/2011 | Bai et al. |
| 2014/0015395 A1 | | 1/2014 | Anthony et al. |
| 2014/0162162 A1 | | 6/2014 | Kalika et al. |

FOREIGN PATENT DOCUMENTS

| | | |
|---|---|---|
| JP | 2000039254 | 2/2000 |
| WO | 9920961 | 4/1999 |
| WO | 0160598 A2 | 8/2001 |

\* cited by examiner

METHOD FOR ENSURING RELIABLE CORE MATERIAL FILL AROUND THE PASS THROUGHS IN A VACUUM INSULATED STRUCTURE

BACKGROUND OF THE DISCLOSURE

Various types of insulated cabinets and doors have been developed for refrigerators and the like. Refrigerator doors and/or cabinets may comprise vacuum insulated structures having an outer wrapper that is sealed to an inner liner to form a vacuum cavity that is filled with various different porous materials. In most refrigerators, utility lines such as power, refrigerant, and/or water lines may need to be run through the insulated structure to provide for various refrigerator components such as ice and water dispensers. However, routing such utility lines through insulated structures may be problematic.

SUMMARY

According to one aspect of the present disclosure, a method for adding a vacuum core material fill around an elongated umbilical in a vacuum insulated refrigerator structure is provided. The method includes forming a shell having a liner and a wrapper wherein the shell forms an internal cavity, forming an elongated umbilical having one or more elongated internal passageways extending lengthwise within the umbilical, forming a gas permeable casing surrounding the elongated umbilical, inserting a vacuum tube at a first opening between the gas permeable casing and the elongated umbilical, coupling a first end of the elongated umbilical to the shell with a first fitting at the first opening, coupling a second end of the elongated umbilical to the shell with a second fitting at a second opening, forming a vacuum in the internal cavity of the shell through the vacuum tube while adding the vacuum core material fill, and routing one or more utility lines through the one or more elongated internal passageways wherein a portion of the utility lines are disposed inside the umbilical and opposite ends of the one or more utility lines extend out of opposite ends of the umbilical.

According to another aspect of the present disclosure, a method of adding a vacuum core material fill around an elongated umbilical in a vacuum insulated refrigerator structure is provided. The method includes forming a shell having a liner and a wrapper wherein the shell forms an internal cavity and the shell has a widened portion in the wrapper, positioning an elongated umbilical in the widened portion of the shell wherein the elongated umbilical has one or more elongated internal passageways extending lengthwise within the umbilical, coupling a first end of the elongated umbilical to the shell with a first fitting at a first opening, coupling a second end of the elongated umbilical to the shell with a second fitting at a second opening, inserting a gas permeable vacuum tube between the widened portion of the wrapper and the elongated umbilical, forming a vacuum in the internal cavity of the shell with the gas permeable vacuum tube while adding the vacuum core material fill, and routing one or more utility lines through the one or more elongated internal passageways wherein a portion of the utility lines are disposed inside the elongated umbilical and opposite ends of the utility lines extend out of opposite ends of the elongated umbilical.

According to another aspect of the present disclosure, a vacuum insulated refrigerator structure is provided. The vacuum insulated refrigerator structure includes a shell defining an internal cavity, an elongated umbilical member defining an elongated internal space and having a central portion disposed in the internal vacuum cavity, and opposite end portions that are sealingly connected to the shell, each opposite end portion having an opening that permits access to the elongated internal space from outside of the shell, a gas permeable vacuum tube disposed in the internal vacuum cavity between the elongated umbilical member and the shell, a vacuum core material fill positioned in the internal cavity, and first and second utility lines disposed in the first and second elongated internal passageways, respectively, and having opposite ends extending out of the openings at the opposite ends of the elongated umbilical member.

These and other features, advantages, and objects of the present device will be further understood and appreciated by those skilled in the art upon studying the following specification, claims, and appended drawings.

DETAILED DESCRIPTION OF EMBODIMENTS

Figure 1:
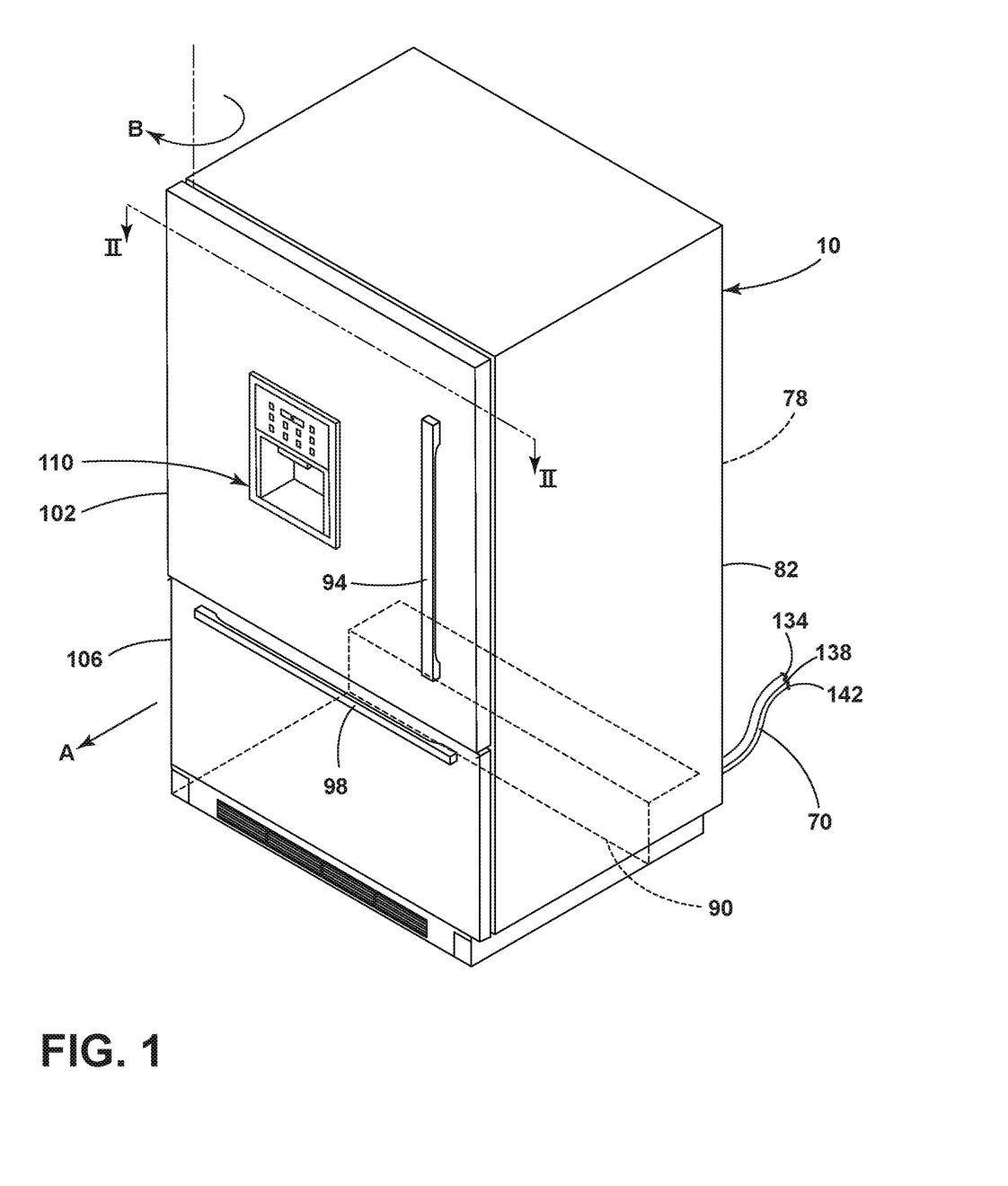
FIG. 1 is a front isometric view of a refrigerator according to one aspect of the present disclosure.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," wherein used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-7, reference numeral 10 generally designates a vacuum insulated refrigerator structure with a vacuum core material fill 14 added in around an elongated umbilical 18. The vacuum insulated refrigerator structure 10 is made of a shell 22 having a liner 26 and a wrapper 30 wherein the shell 22 forms an internal cavity 34. In the shell 22, the elongated umbilical 18 has one or more elongated internal passageways 38 extending lengthwise within the elongated umbilical 18. A gas permeable casing 42 surrounds the entire length of the elongated umbilical 18 passing through the internal cavity 34 of the shell 22. A vacuum tube 46 is inserted at a first opening 50 between the gas permeable casing 42 and the elongated umbilical 18 proximate to where a first end 54 of the elongated umbilical 18 is coupled to the shell 22 at the first opening 50. A second end 58 of the elongated umbilical 18 is coupled to the shell 22 at a second opening 62 in the liner 26. A vacuum 66 is formed in the internal cavity 34 of the shell 22 through the vacuum tube 46 while adding the vacuum core material fill 14. One or more utility lines 70 may be routed through the one or more elongated internal passageways 38 wherein a portion 74 of the one or more utility lines 70 are disposed inside the elongated umbilical 18 and opposite ends of the one or more utility lines 70 extend out of opposite ends of the elongated umbilical 18.

Figure 2:
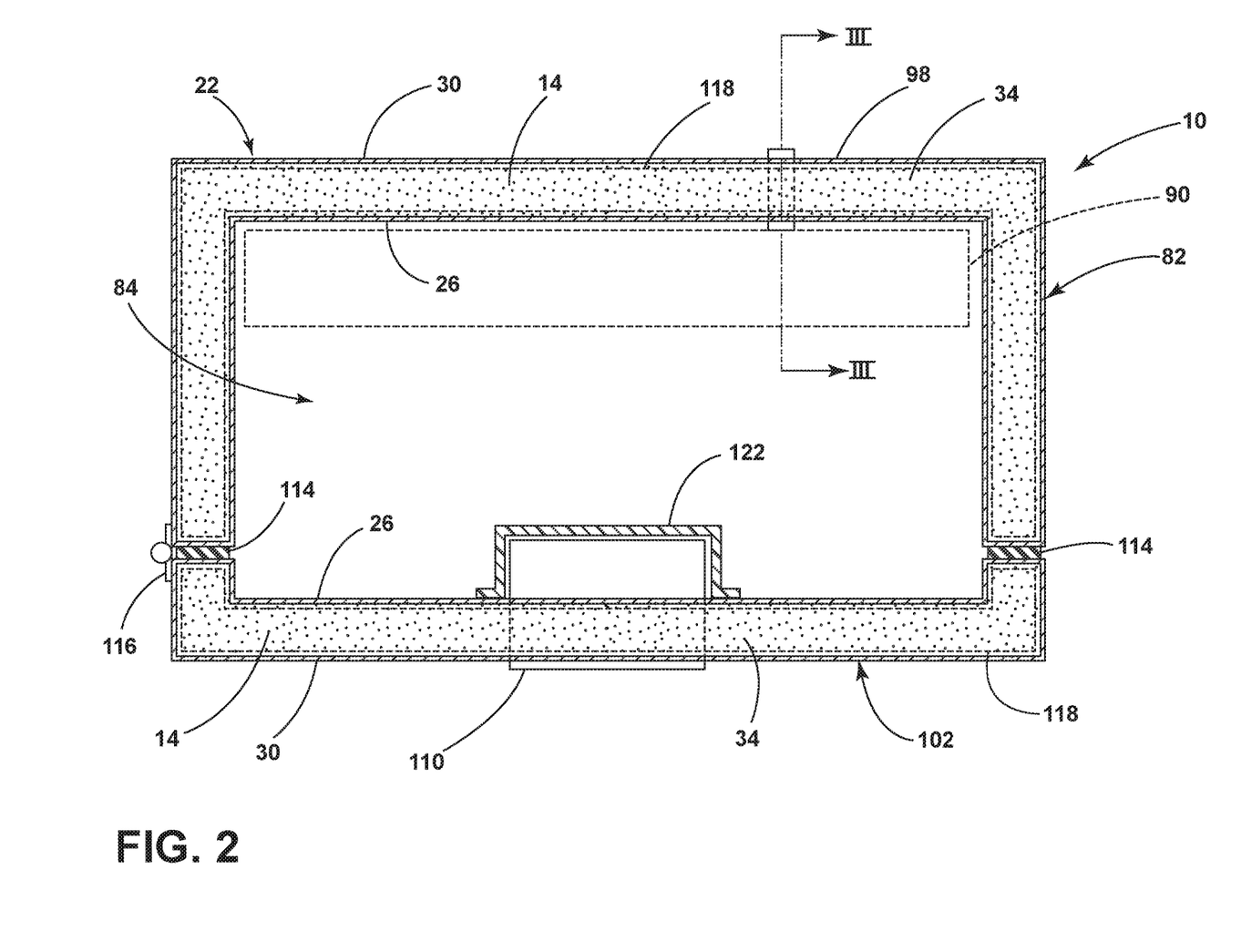
FIG. 2 is a cross-sectional view of the refrigerator of FIG. 1 taken along the line II-II according to one aspect of the present disclosure.

Referring now to FIG. 1, the vacuum insulated refrigerator structure 10 according to one aspect of the present disclosure includes a cabinet 82 having a back wall 78 with the one or more utility lines 70 coming out of the back wall 78. The cabinet 82 has an interior space 84 (FIG. 2) that is insulated and refrigerated and may include a conventional powered cooling system (not shown) that is mounted in a machine compartment 90. Mounted to the front of the cabinet 82 are a refrigerator handle 94 and a freezer handle 98 coupled to a refrigerator door 102 and a freezer door 106, respectively. The refrigerator door 102 and the freezer door 106 may be movably mounted to the cabinet 82 by one or more hinges 116 (FIG. 2). In the illustrated example, the freezer door 106 has a drawer that can be translated linearly as indicated by the arrow (A). The refrigerator door 102 is rotatably mounted to the cabinet 82 by hinges 116 or the like in a known manner, and rotates about a vertical axis as indicated by the arrow (B). The vacuum insulated refrigerator structure 10 may include additional doors (not shown) in various shapes and configurations as may be required for a particular application. In some embodiments, the vacuum insulated refrigerator structure 10 has a refrigerator door 102 including an ice/water dispensing unit 110 that is accessible from an outer side of the refrigerator door 102, wherein the ice/water dispensing unit 110 is configured to dispense at least one of ice and liquid water. The one or more utility lines 70 include at least one water line that is connected to the ice/water dispensing unit 110, and at least one electrical line that is connected to the ice/water dispensing unit 110. The cooling system and/or machine compartment 90 may include a compressor, condenser, evaporator, and other related compounds that cool one or more refrigerated and/or freezer compartments. Alternatively, the vacuum insulated refrigerator structure 10 may include a thermoelectric cooling system.

Figure 3:
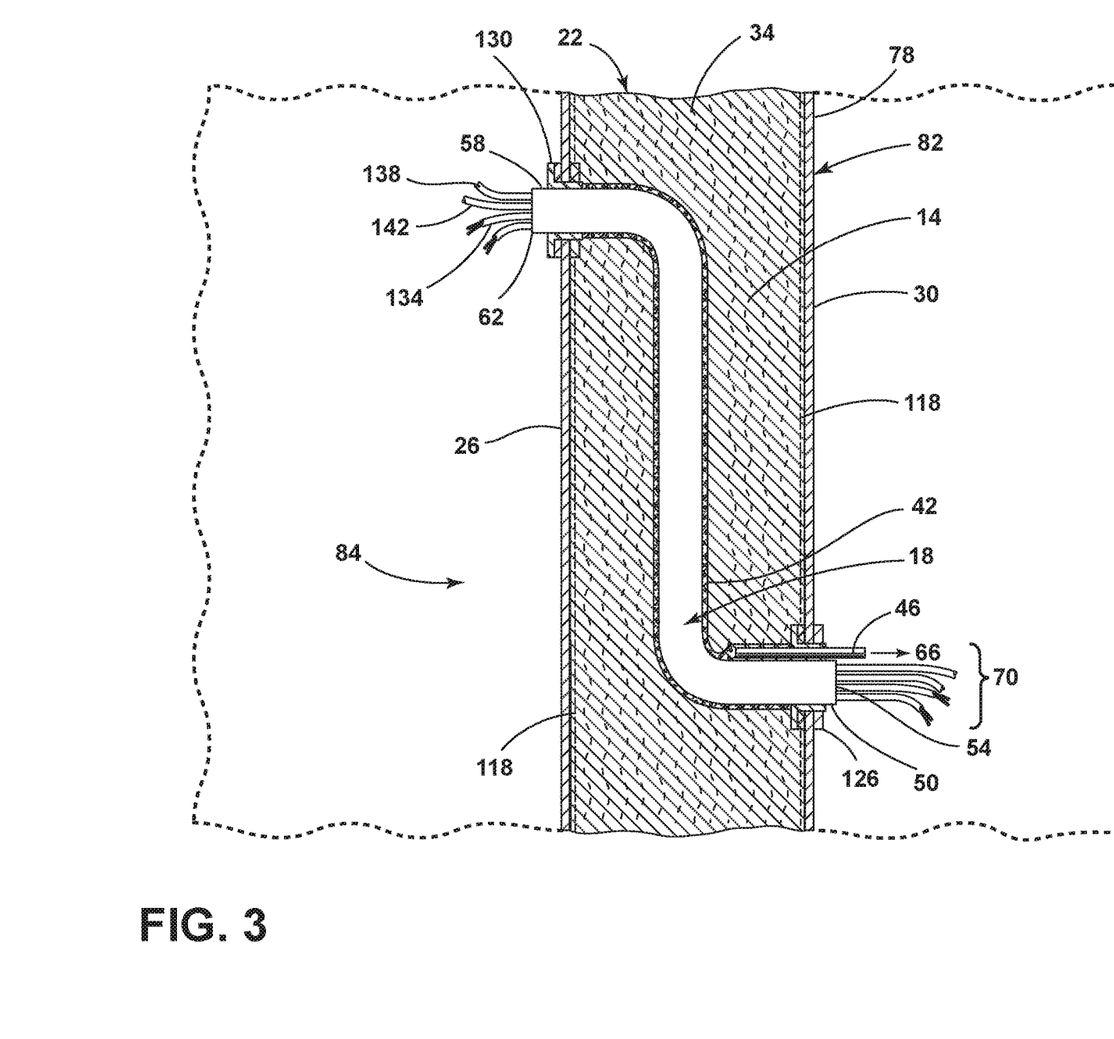
FIG. 3 is a cross-sectional view of a portion of the refrigerator of FIG. 2 taken along the line III-III according to one aspect of the present disclosure.

As also shown in FIG. 1, the ice/water dispensing unit 110 may be mounted into the refrigerator door 102 in some embodiments. Power lines 134, water lines 138, and refrigeration lines 142 may be operably connected to the ice/water dispensing unit 110 or other components. In some embodiments, the machine compartment 90 of the vacuum insulated refrigerator structure 10 may house various cooling system components (not shown) outside and separate from the refrigerator's interior space 84 (FIG. 2). As discussed in more detail below, power 134 and/or water 138 and/or refrigeration 142 lines may be routed through the shell 22 (FIG. 2) or back wall 78 of the cabinet 82 by passing these one or more utility lines 70 through the elongated umbilical 18 (FIG. 3). The one or more utility lines 70, as defined herein, may include at least one or any combination of power lines 134, water lines 138, and/or refrigeration lines 142. In some embodiments, the elongated umbilical 18 may be made from an impermeable polymer material, a metal material, a composite, or a combination thereof. In other embodiments, the elongated umbilical member 18 may be constructed from a multi-layer polymer material including a barrier layer that is substantially impervious to at least one gas.

With reference to FIG. 2, one or more seals 114 are utilized to seal in the interior space 84 around the one or more hinges 116 when the refrigerator door 102 or the freezer door 106 (FIG. 1) are in a closed position. The ice/water dispensing unit 110 may be at least partially disposed within an inner structure 122 mounted to the refrigerator door 102. Cabinet 82 includes the shell 22 made of the liner 26, outer wrapper 30, and the vacuum core material fill 14. The liner 26 and the wrapper 30 may be made of thermoformed polymer material or from sheet metal that is bent/formed. The wrapper 30 and the liner 26 may be constructed from a polymer or metal that is impervious to gasses to promote formation of a vacuum. Similarly, the refrigerator door 102 and/or the freezer door 106 may also include vacuum insulated structures also made with the wrapper 30 and the liner 26, and the vacuum core material fill 14. In some embodiments, the liner 26 and the wrapper 30 are interconnected around a perimeter of the vacuum insulated refrigerator structure 10 during assembly to form a substantially impervious structure. As discussed in more detail below, the vacuum core material fill 14 may be formed from a porous/permeable filler material such as a silica powder. In some embodiments, the vacuum core material fill 14 may optionally be disposed within an impermeable envelope 118. In some embodiments, the impermeable envelope 118 is positioned within the shell 22 wherein the internal cavity 34 is located within the impermeable envelope 118. The impermeable envelope 118 may be made of thermoformed or thermoset polymer materials impermeable to gasses or water. The vacuum core material fill 14 may be formed from various porous/permeable filler materials such as open cell foam, glass fibers, or other suitable materials. The construction of the wrappers 30 or the liners 26 in the refrigerator door 102 or the freezer door 106 may be substantially similar to known vacuum insulated refrigerator structures. In general, the shell's 22 internal cavity 34 of the refrigerator door 102, the freezer door 106, or the cabinet 82 makes up a sealed space which is filled with the vacuum core material fill 14 and a vacuum is then formed in the internal cavities 34 during the process of fabricating the cabinet 82 and the refrigerator door 102 and the freezer door 106. In some embodiments, the air pressure of the internal cavity 34 of the shell 22 can be less than 1 atm., 0.5 atm., 0.1 atm., or 01. atm.

With reference to FIG. 3, the elongated umbilical 18 may be routed through the shell 22 of the refrigerator door 102 (FIG. 1), the freezer door 106 (FIG. 1), and/or the cabinet 82 as required for a particular application. In FIG. 3, the elongated umbilical 18 extends through the back wall 78 of the cabinet 82 between the interior space 84 and the machine compartment 90 (FIG. 1). The one or more utility lines 70 may be routed through a conduit such as the elongated umbilical 18 to provide water and/or electricity and/or refrigerant. The one or more utility lines 70 pass through the elongated umbilical 18 through one or more elongated internal passageways 38 (FIG. 5) while a vacuum is maintained in the internal cavity 34 of the shell 22 making up the cabinet 82, refrigerator door 102, and/or freezer door 106. In the illustrated example, the gas permeable casing 42 surrounds the entire length of the elongated umbilical 18 so the vacuum tube 46 can be inserted between the gas permeable casing 42 and the elongated umbilical 18. In some embodiments, the gas permeable casing 42 comprises a polymer material, a filter paper material, a glass fritted filter, or a combination thereof. The first end 54 of the elongated umbilical 18 is coupled to the shell 22 at the first opening 50 of the wrapper 30. The second end 58 of the elongated umbilical 18 is coupled to the shell 22 at the second opening 62 of the liner 26. After coupling the first end 54 and the second end 58 to the wrapper 30 and liner 26, respectively, of the shell 22 at the first opening 50 and the second opening 62, the vacuum 66 may reduce the air pressure in the internal cavity 34 of the shell 22 through the vacuum tube 46. While the vacuum 66 is reducing the air pressure in the internal cavity 34, the vacuum core material fill 14 may be added to fill the internal cavity 34 to form a uniformly well-packed shell 22. A first fitting 126 provides an airtight seal at the first end 54 of the elongated umbilical 18. A second fitting 130 provides a sealing connection at the second end 58 of the elongated umbilical 18 at the second opening 62. In some embodiments, the second opening 62 leads to the inner structure 122 (FIG. 2) where the one or more utility lines 70 are coupled to the ice/water dispensing unit 110 (FIG. 1.). In the illustrated example, the inner structure 122 may be an impermeable barrier to maintain the vacuum within the internal cavity 34. As discussed in more detail below, the elongated umbilical 18 includes one or more elongated internal passageways 38 that is generally at atmospheric pressure to thereby permit routing of the one or more utility lines 70 through the interior space. It will be understood that the shape and location of the elongated umbilical 18 may vary depending upon the requirements of a particular application, and the configuration of FIG. 3 is merely an example of one possible configuration.

Figure 4:
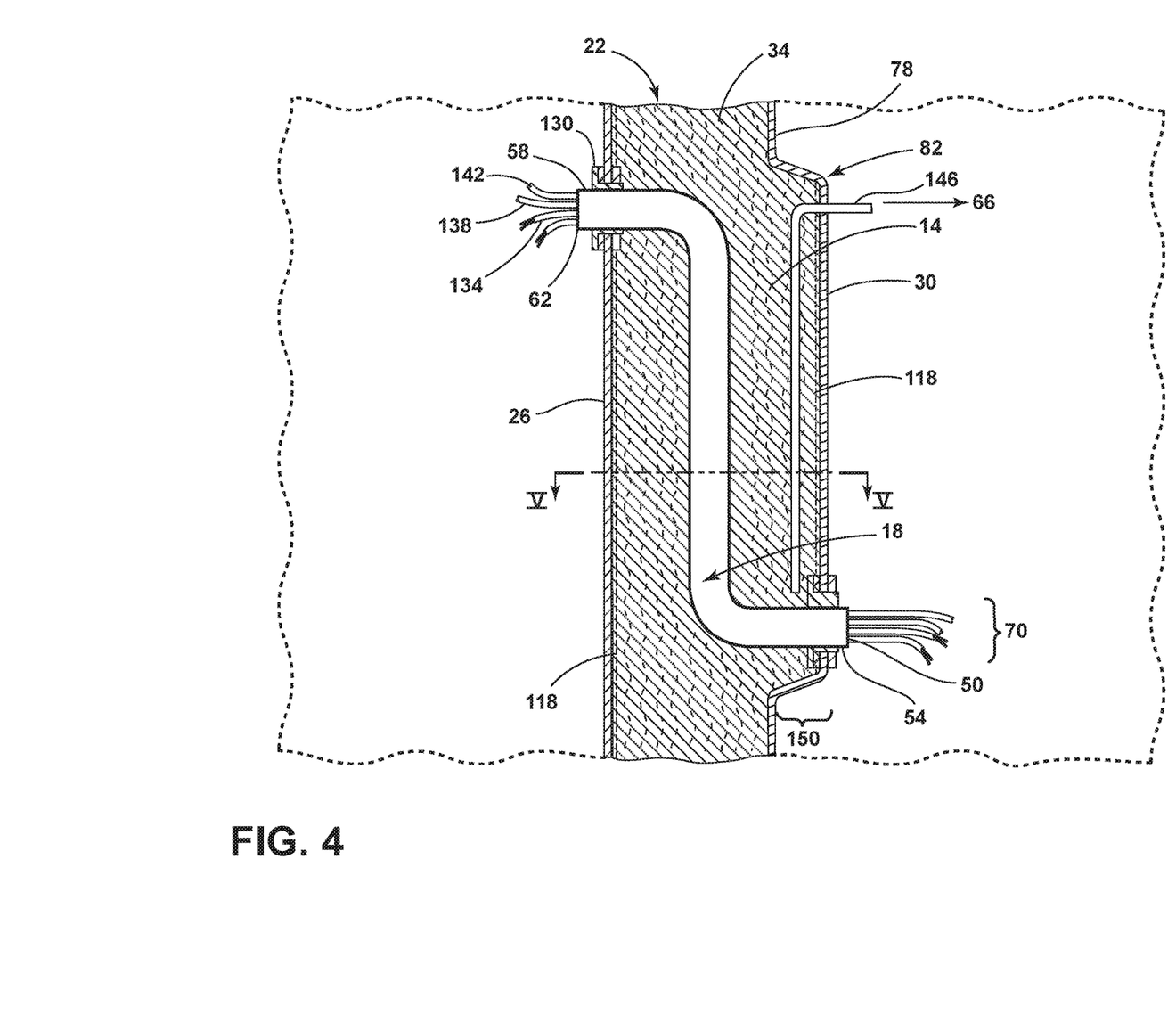
FIG. 4. is a cross-sectional view of a portion of the refrigerator of FIG. 2 taken along the line III-III according to another aspect of the present disclosure.

With reference to FIG. 4, the elongated umbilical 18 may be routed through the refrigerator door 102 (FIG. 1), the freezer door 106 (FIG. 1), and/or the cabinet 82 as required for a particular application. In FIG. 3, for example, the elongated umbilical 18 extends through the back wall 78 of the cabinet 82 between the interior space 84 and the machine compartment 90. The one or more utility lines 70 may be routed through the elongated umbilical 18 to provide water and/or electricity and/or refrigerant. The one or more utility lines 70 pass through the elongated umbilical 18 through one or more elongated internal passageways 38 while a vacuum is maintained in the internal cavity 34 of the shell 22 making up the cabinet 82, refrigerator door 102, and/or freezer door 106. In the illustrated example, the shell 22 is formed by engaging the liner 26 with the wrapper 30 where the wrapper 30 is extended, molded, or bent, or expanded out in a sharpened area to widen a portion of the shell 22 where the elongated umbilical 18 will be positioned. The first end 54 of the elongated umbilical 18 is coupled to the shell 22 at the first opening 50 of the wrapper 30. The second end 58 of the elongated umbilical 18 is coupled to the shell 22 at the second opening 62 of the liner 26. A gas permeable vacuum tube 146 is inserted between a widened portion 150 of the wrapper 30 and the elongated umbilical 18. After coupling the first end 54 and the second end 58 to the wrapper 30 and liner 26, respectively, of the shell 22 at the first opening 50 and the second opening 62, the vacuum 66 may reduce the air pressure in the internal cavity 34 of the shell 22 through a gas permeable vacuum tube 146. The widened portion 150 of the shell 22 coincides with the placement of the elongated umbilical 18 so that the amount of the vacuum core material fill 14 can maintain its depth or amount of insulation around the elongated umbilical 18 and between the liner 26 and wrapper 30.

In some embodiments, the gas permeable vacuum tube 146 comprises a polymer material, a filter paper material, a glass fritted filter, or a combination thereof. While the vacuum 66 is reducing the air pressure in the internal cavity 34, the vacuum core material fill 14 may be added to fill the internal cavity 34 to form a uniformly well-packed shell 22. The first fitting 126 provides an airtight seal at the first end 54 of the elongated umbilical 18. The second fitting 130 provides a sealing connection at the second end 58 of the elongated umbilical 18 at the second opening 62.

In some embodiments, the second opening 62 leads to the inner structure 122 (FIG. 2) where the one or more utility lines 70 are coupled to the ice/water dispensing unit 110 (FIG. 1). In the illustrated example, the inner structure 122 comprises an impermeable barrier to maintain the vacuum 66 within the internal cavity 34.

As discussed in more detail below, the elongated umbilical 18 includes one or more elongated internal passageways 38 (FIG. 5) that are generally at atmospheric pressure to thereby permit routing of the one or more utility lines 70 through the interior space 84. It will be understood that the shape and location of the elongated umbilical 18 may vary depending upon the requirements of a particular application, and the configuration of FIG. 4 is merely an example of one possible configuration.

Figure 5:
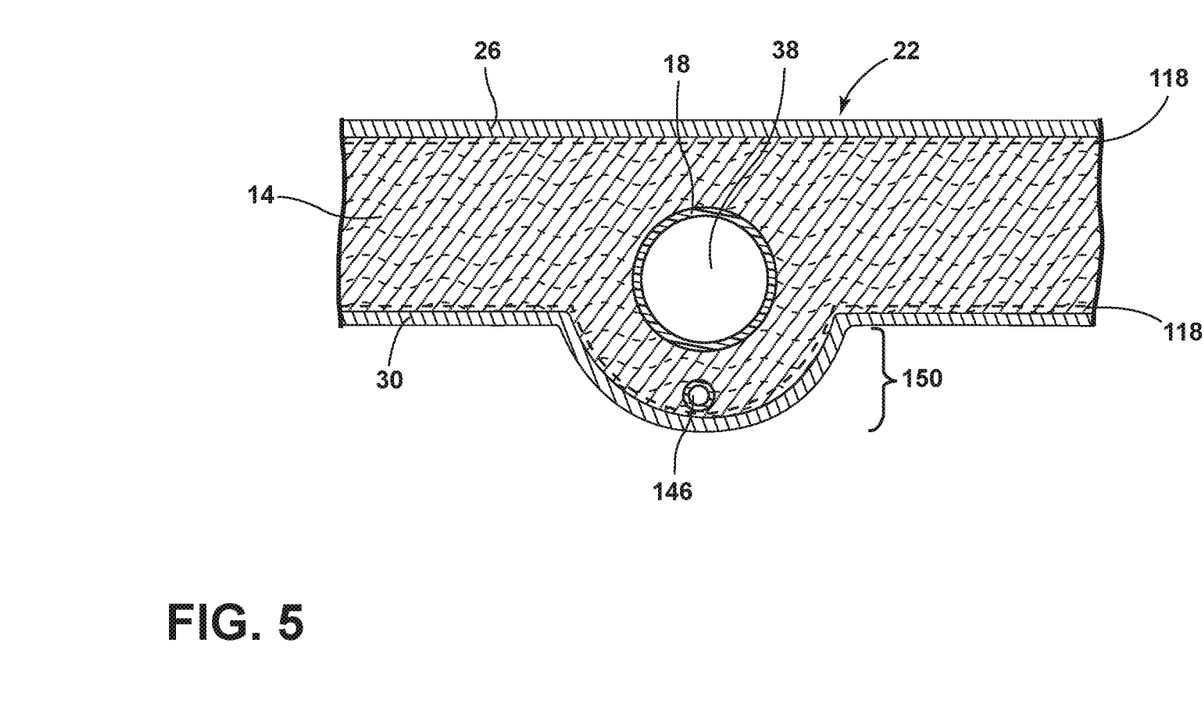
FIG. 5 is a cross-sectional view of a portion of the refrigerator of FIG. 4 taken along the line V-V according to one aspect of the present disclosure.

With reference to FIG. 5, a cross-sectional view of the shell 22 having the liner 26, the wrapper 30, and the vacuum core material fill 14 is shown. The widened portion 150 of the wrapper 30 is shown having the gas permeable vacuum tube 146 running lengthwise down the widened portion 150 between the wrapper 30 and the elongated umbilical 18. As can be seen in FIG. 5, the widened portion 150 of the wrapper 30 provides extra space for the vacuum core material fill 14 to be packed around the elongated umbilical 18 to provide adequate insulation to maintain temperatures in the interior space 84 (FIG. 2) of the vacuum insulated refrigerator structure 10 (FIG. 1) with an improved efficiency. In the embodiment shown in FIG. 5, one elongated internal passageway 38 is shown to pass through the one or more utility lines 70 through the shell 22.

Figure 6:
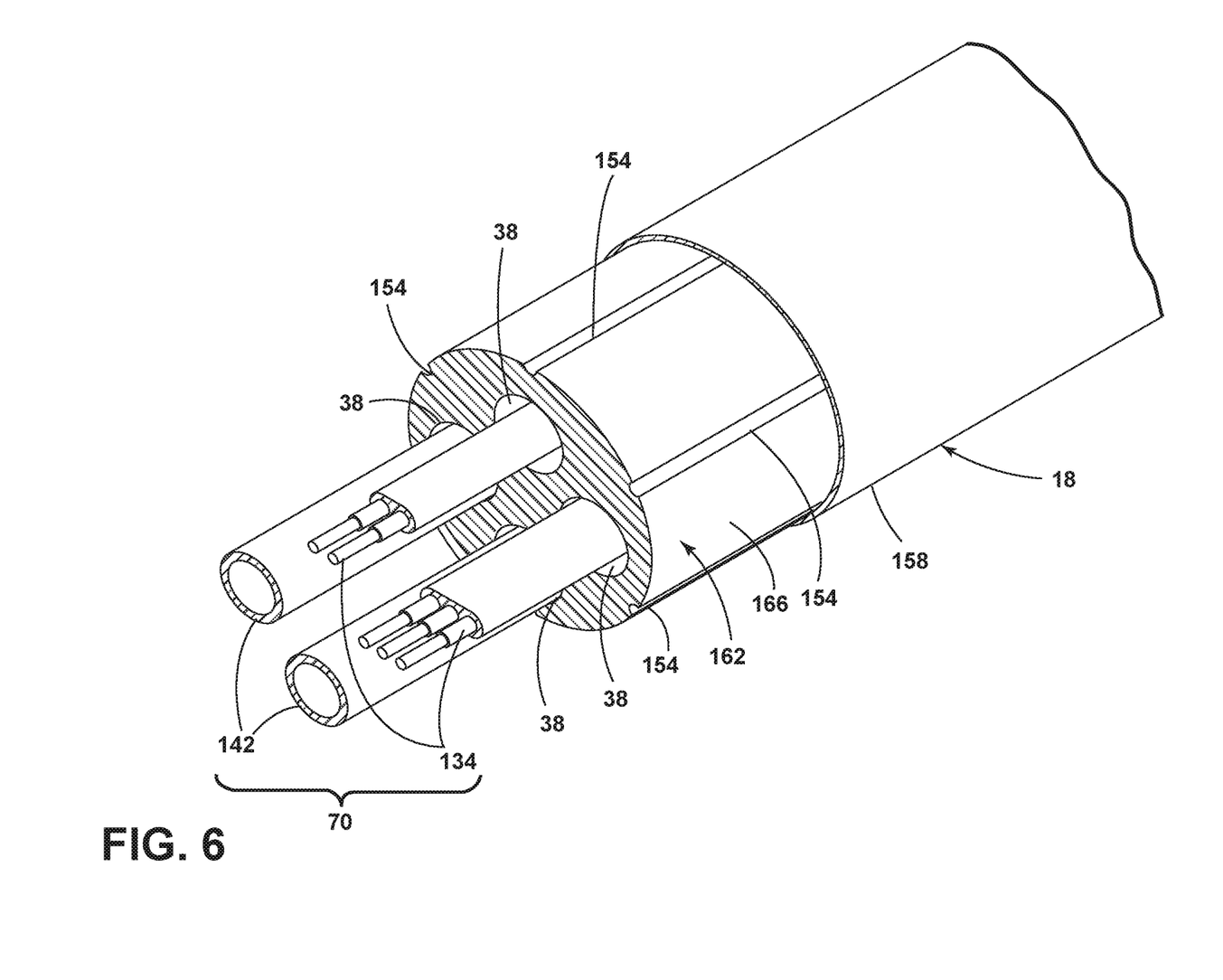
FIG. 6 is a partially exploded cross-sectional view of an umbilical according to one aspect of the present disclosure.

With reference to FIG. 6, the elongated umbilical 18 includes an umbilical outer casing 158 and an inner space material 162 that is disposed around the one or more utility lines 70 within the outer casing 158. The inner space material 162 includes a plurality of elongated internal passageways 38 through which one or more utility lines 70 such as power lines 134, water lines 138 (FIG. 3), and/or refrigeration lines 142 may be routed. In some embodiments, the inner space material 162 may be formed from polyurethane foam or other insulating materials to prevent or reduce heat transfer to or from the one or more utility lines 70 from the shell 22 of the cabinet 82 (FIG. 4). In some embodiments, the umbilical outer casing 158 may be formed from a metal or a plastic conduit. The umbilical outer casing 158 must be made to be relatively impermeable to air to thereby ensure that a vacuum is maintained within the shell's 22 internal cavity 34 (FIG. 5) of the doors 102, 106 (FIG. 1) or the cabinet 82. Thus, if the umbilical outer casing 158 is formed from a polymer material, the umbilical outer casing 158 may include one or more layers of polymer that are impermeable to gasses. The inner space material 162 may be made from an insulation material such as polystyrene (PS), expanded polystyrene (EPS), and/or polyurethane (PU) foam. In some embodiments, one or more grooves 154 may be formed in the outer surface 166 of the inner space material 162 to help with placement and the expansion/contraction of the inner space material 162. The elongated umbilical 18 may have a generally circular cross-sectional shape in some embodiments or any other suitable shape as needed by the application.

Figure 7:
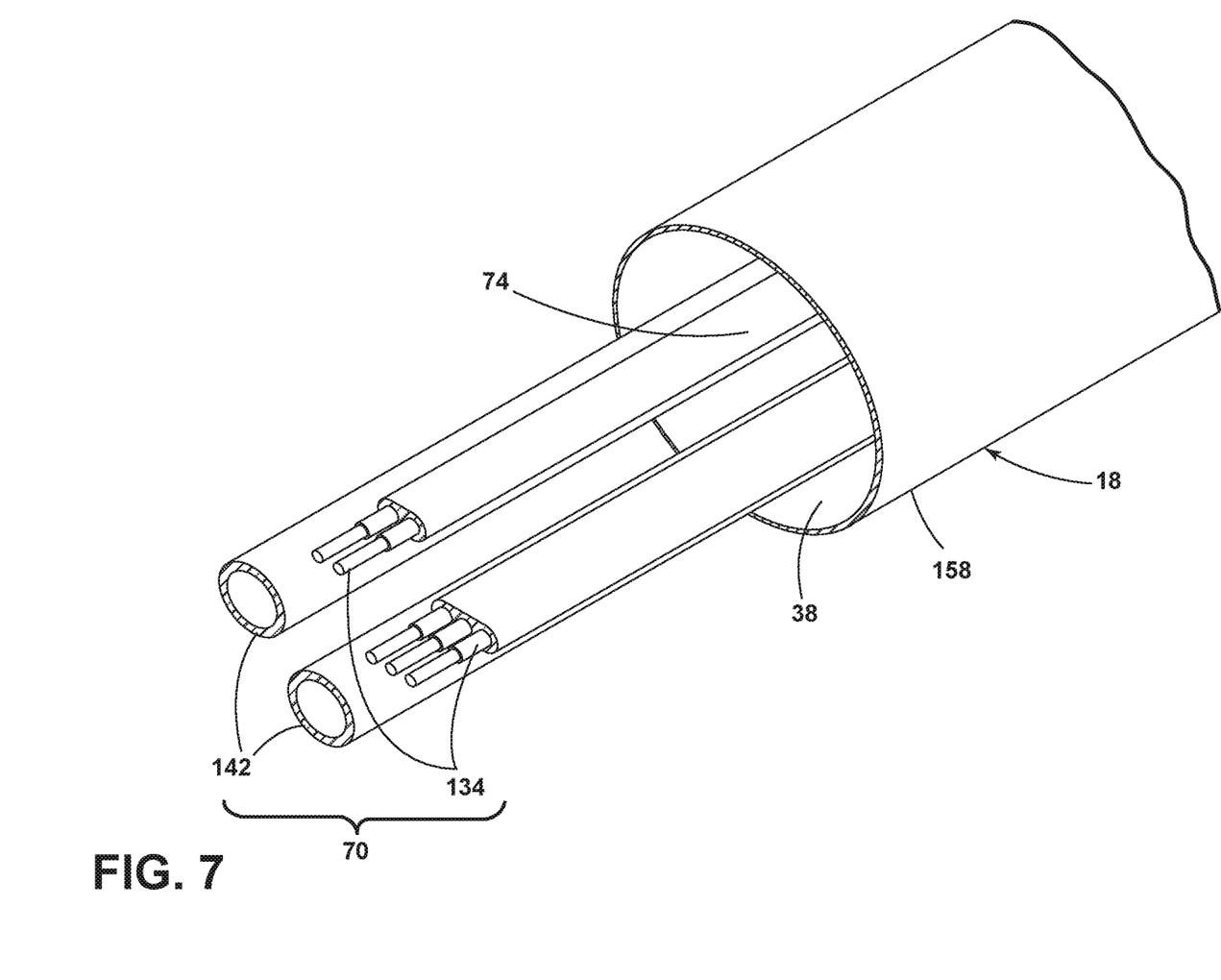
FIG. 7 is a partially exploded cross-sectional view of an umbilical according to another aspect of the present disclosure.

With reference to FIG. 7, the elongated umbilical 18 includes an umbilical outer casing 158 and one or more utility lines 70 disposed within this outer casing 158. The umbilical outer casing 158 may be formed from a metal or a plastic conduit. The umbilical outer casing 158 must be relatively impermeable to air to thereby ensure that a vacuum is maintained within the interior cavity 30 (FIG. 5) of the doors 102, 106 (FIG. 1) and/or the cabinet 82 (FIG. 4). Thus, if the umbilical outer casing 158 is formed from a polymer material, the umbilical outer casing 158 may include one or more layers of polymer that are impermeable to gasses. In some embodiments, the elongated umbilical 18 not having the inner space material 162 (FIG. 6) may have a generally circular cross-sectional shape in some embodiments or any other suitable shape as needed by the application.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

LISTING OF NON-LIMITING EMBODIMENTS

Embodiment A is a method for adding a vacuum core material fill around an elongated umbilical in a vacuum insulated refrigerator structure, the method comprising: forming a shell comprising a liner and a wrapper wherein the shell forms an internal cavity; forming an elongated umbilical having one or more elongated internal passageways extending lengthwise within the umbilical; forming a gas permeable casing surrounding the elongated umbilical; inserting a vacuum tube at a first opening between the gas permeable casing and the elongated umbilical; coupling a first end of the elongated umbilical to the shell with a first fitting at the first opening; coupling a second end of the elongated umbilical to the shell with a second fitting at a second opening; forming a vacuum in the internal cavity of the shell through the vacuum tube while adding the vacuum core material fill; and routing one or more utility lines through the one or more elongated internal passageways wherein a portion of the one or more utility lines are disposed inside the umbilical and opposite ends of the one or more utility lines extend out of opposite ends of the umbilical.

The method of Embodiment A wherein the vacuum insulated refrigerator structure further comprises a refrigerator door including a dispensing unit that is accessible from an outer side of the refrigerator door, wherein the dispensing unit is configured to dispense at least one of ice and liquid water; and the one or more utility lines include at least one water line that is connected to the dispensing unit, and at least one electrical line that is connected to the dispensing unit.

The method of Embodiment A or Embodiment A with any of the intervening features wherein the liner and the wrapper are interconnected around a perimeter of the vacuum insulated refrigerator structure during assembly to form a substantially impervious structure; and the first and second ends of the elongated umbilical are sealingly connected to the shell before the liner and wrapper are assembled.

The method of Embodiment A or Embodiment A with any one of the intervening features wherein positioning an impermeable envelope within the shell wherein the internal cavity is located within the impermeable envelope.

The method of Embodiment A or Embodiment A with any one of the intervening features wherein the liner is formed by thermoforming a sheet of polymer or by bending sheet metal; and the wrapper is formed by bending the sheet metal.

The method of Embodiment A or Embodiment A with any one of the intervening features wherein the elongated umbilical comprises an impermeable polymer material.

The method of Embodiment A or Embodiment A with any one of the intervening features wherein the elongated umbilical comprises a metal material.

The method of Embodiment A or Embodiment A with any one of the intervening features wherein the gas permeable casing comprises a polymer material.

The method of Embodiment A or Embodiment A with any one of the intervening features wherein the gas permeable casing comprises a filter paper material.

Embodiment B is a method of adding a vacuum core material fill around an elongated umbilical in a vacuum insulated refrigerator structure, the method comprising: forming a shell comprising a liner and a wrapper wherein the shell forms an internal cavity and the shell has a widened portion in the wrapper; positioning an elongated umbilical in the widened portion of the shell wherein the elongated umbilical has one or more elongated internal passageways extending lengthwise within the umbilical; coupling a first end of the elongated umbilical to the shell with a first fitting at a first opening; coupling a second end of the elongated umbilical to the shell with a second fitting at a second opening; inserting a gas permeable vacuum tube between the widened portion of the wrapper and the elongated umbilical; forming a vacuum in the internal cavity of the shell with the gas permeable vacuum tube while adding the vacuum core material fill; and routing one or more utility lines through the one or more elongated internal passageways wherein a portion of the one or more utility lines are disposed inside the elongated umbilical and opposite ends of the utility lines extend out of opposite ends of the elongated umbilical.

The method of Embodiment B wherein the vacuum insulated refrigerator structure further comprises a refrigerator door including a dispensing unit that is accessible from an outer side of the refrigerator door, wherein the dispensing unit is configured to dispense at least one of ice and liquid water; and the one or more utility lines include at least one water line that is connected to the dispensing unit, and at least one electrical line that is connected to the dispensing unit.

The method of Embodiment B or Embodiment B with any one of the intervening features wherein the widened portion of the shell coincides with the placement of the elongated umbilical.

The method of Embodiment B or Embodiment B with any one of the intervening features wherein the liner is formed by thermoforming a sheet of polymer or by bending sheet metal; and the wrapper is formed by bending the sheet metal.

The method of Embodiment B or Embodiment B with any one of the intervening features wherein the elongated umbilical comprises an impermeable polymer material.

The method of Embodiment B or Embodiment B with any one of the intervening features wherein the gas permeable vacuum tube comprises a polymer material.

The method of Embodiment B or Embodiment B with any one of the intervening features wherein the core material fill is a porous filler material selected from the group consisting of: fumed silica, precipitated silica, and blends of different insulation materials.

Embodiment C is a vacuum insulated refrigerator structure comprising: a shell defining an internal cavity; an elongated umbilical member defining an elongated internal space and having a central portion disposed in the internal vacuum cavity, and opposite end portions that are sealingly connected to the shell, each opposite end portion having an opening that permits access to the elongated internal space from outside of the shell; a gas permeable vacuum tube disposed in the internal vacuum cavity between the elongated umbilical member and the shell; a vacuum core material fill positioned in the internal cavity; and first and second utility lines disposed in the first and second elongated internal passageways, respectively, and having opposite ends extending out of the openings at the opposite ends of the elongated umbilical member.

The structure of Embodiment C wherein the elongated umbilical member comprises a multi-layer polymer material including a barrier layer that is substantially impervious to at least one gas.

The structure of Embodiment C or Embodiment C with any one of the intervening features wherein the core material fill is a porous filler material selected from the group consisting of: fumed silica, precipitated silica, and blends of different insulation materials.

The structure of Embodiment C or Embodiment C with any one of the intervening features wherein the vacuum insulated refrigerator structure further comprises a refrigerator door including a dispensing unit that is accessible from an outer side of the refrigerator door, wherein the dispensing unit is configured to dispense at least one of ice and liquid water.

What is claimed is:

1. A method for adding a vacuum core material fill around an elongated umbilical in a vacuum insulated refrigerator structure, the method comprising:
    providing a shell having a liner and a wrapper wherein the shell forms an internal cavity;
    providing an elongated umbilical having one or more elongated internal passageways extending lengthwise within the umbilical;
    providing a gas permeable casing surrounding the elongated umbilical;
    inserting a vacuum tube between the gas permeable casing and the elongated umbilical at a first opening;
    coupling a first end of the elongated umbilical to the shell with a first fitting at the first opening;
    coupling a second end of the elongated umbilical to the shell with a second fitting at a second opening;
    forming a vacuum in the internal cavity of the shell through the vacuum tube while adding the vacuum core material fill; and
    routing one or more utility lines through the one or more elongated internal passageways, wherein a portion of the one or more utility lines are disposed inside the umbilical and opposite ends of the one or more utility lines extend out of opposite ends of the umbilical.

2. The method of claim 1, wherein: the vacuum insulated refrigerator structure includes a refrigerator door having a dispenser that is accessible from an outer side of the refrigerator door, wherein the dispenser is configured to dispense at least one of ice and liquid water; and routing the one or more utility lines includes routing at least one water line that is connected to the dispenser, and routing at least one electrical line that is connected to the dispenser.

3. The method of claim 1, further comprising:
interconnecting the liner and the wrapper around a perimeter of the vacuum insulated refrigerator structure during assembly to form a substantially impervious structure; and
sealingly connecting the first and second ends of the elongated umbilical to the shell before the liner and wrapper are assembled.

4. The method of claim 1 further comprising:
positioning an impermeable envelope within the shell wherein the internal cavity is located within the impermeable envelope.

5. The method of claim 1, further comprising:
forming the liner by thermoforming a sheet of polymer or by bending sheet metal; and
forming the wrapper by bending sheet metal.

6. The method of claim 1, further comprising:
forming the elongated umbilical from an impermeable polymer material.

7. The method of claim 1, further comprising:
forming the elongated umbilical from a metal material.

8. The method of claim 1, further comprising:
forming the gas permeable casing from a polymer material.

9. The method of claim 1, further comprising:
forming the gas permeable casing from a filter paper material.

10. A method of adding a vacuum core material fill around an elongated umbilical in a vacuum insulated refrigerator structure, the method comprising:
forming a shell having a liner and a wrapper, wherein the shell forms an internal cavity and the shell has a widened portion in the wrapper;
positioning an elongated umbilical in the widened portion of the shell, wherein the elongated umbilical has one or more elongated internal passageways extending lengthwise within the umbilical;
coupling a first end of the elongated umbilical to the shell with a first fitting at a first opening;
coupling a second end of the elongated umbilical to the shell with a second fitting at a second opening;
inserting a gas permeable vacuum tube between the widened portion of the wrapper and the elongated umbilical;
forming a vacuum in the internal cavity of the shell with the gas permeable vacuum tube while adding vacuum core material fill; and
routing one or more utility lines through the one or more elongated internal passageways, wherein a portion of the one or more utility lines are disposed inside the elongated umbilical and opposite ends of the utility lines extend out of opposite ends of the elongated umbilical.

11. The method of claim 10, wherein: the vacuum insulated refrigerator structure includes a refrigerator door having a dispenser that is accessible from an outer side of the refrigerator door, wherein the dispenser is configured to dispense at least one of ice and liquid water; and routing the one or more utility lines includes routing at least one water line that is connected to the dispenser, and routing at least one electrical line that is connected to the dispenser.

12. The method of claim 10, wherein:
the widened portion of the shell coincides with the placement of the elongated umbilical.

13. The method of claim 10, wherein:
the liner is formed by thermoforming a sheet of polymer or by bending sheet metal; and
the wrapper is formed by bending sheet metal.

14. The method of claim 10, further comprising:
forming the elongated umbilical from an impermeable polymer material.

15. The method of claim 10, further comprising:
forming the gas permeable vacuum tube from a polymer material.

16. The method of claim 10, wherein:
adding vacuum core material fill includes adding core material fill comprising a porous filler material selected from the group consisting of: fumed silica, precipitated silica, and blends of different insulation materials.

17. A vacuum insulated refrigerator structure comprising: a shell defining an internal vacuum cavity; an elongated umbilical member defining an elongated internal space and having a central portion disposed in the internal vacuum cavity, and opposite end portions that are sealingly connected to the shell, each opposite end portion having an opening that permits access to the elongated internal space from outside of the shell; a gas permeable vacuum tube disposed in the internal vacuum cavity between the elongated umbilical member and the shell; vacuum core material fill positioned in the internal cavity; and first and second utility lines disposed in the first and second elongated internal passageways, respectively, and having opposite ends extending out of the openings at the opposite ends of the elongated umbilical member.

18. The vacuum insulated refrigerator structure of claim 17, wherein:
the elongated umbilical member comprises a multi-layer polymer material including a barrier layer that is substantially impervious to at least one gas.

19. The vacuum insulated refrigerator structure of claim 17, wherein:
the core material fill is a porous filler material that includes at least one of fumed silica and precipitated silica.

20. The vacuum insulated refrigerator structure of claim 17 further comprising: a refrigerator door including a dispenser that is accessible from an outer side of the refrigerator door, wherein the dispenser is configured to dispense at least one of ice and liquid water.

* * * * *